United States Patent
Raman et al.

(10) Patent No.: US 8,361,428 B2
(45) Date of Patent: Jan. 29, 2013

(54) REDUCED CARBON FOOTPRINT STEAM GENERATION PROCESSES

(75) Inventors: Pattabhi K. Raman, Long Grove, IL (US); Francis S. Lau, Darien, IL (US); Earl T. Robinson, Lakeland, FL (US); Donald Anthony, North Venice, FL (US)

(73) Assignee: GreatPoint Energy, Inc., Cambridge, MA (US)

(*) Notice: Subject to any disclaimer, the term of this patent is extended or adjusted under 35 U.S.C. 154(b) by 1008 days.

(21) Appl. No.: 12/395,320

(22) Filed: Feb. 27, 2009

(65) Prior Publication Data
US 2009/0217585 A1 Sep. 3, 2009

Related U.S. Application Data

(60) Provisional application No. 61/032,736, filed on Feb. 29, 2008.

(51) Int. Cl.
C01B 3/38 (2006.01)
C01B 31/18 (2006.01)
C01B 31/20 (2006.01)
C01B 17/16 (2006.01)
C01B 3/32 (2006.01)
C01C 1/02 (2006.01)

(52) U.S. Cl. .......... 423/437.1; 423/352; 423/418.2; 423/564; 423/580.1; 423/648.1; 423/652; 585/700; 585/733

(58) Field of Classification Search .......... 502/20–56; 48/197 R; 700/271, 266, 268; 422/55, 626; 423/252, 418.2, 437.1, 564, 580.1, 651, 352, 423/648.1, 652; 252/373; 585/700, 733
See application file for complete search history.

(56) References Cited

U.S. PATENT DOCUMENTS

| 2,694,623 A | 11/1954 | Welty, Jr. et al. |
| 2,791,549 A | 5/1957 | Jahnig |
| 2,813,126 A | 11/1957 | Tierney |
| 2,860,959 A | 11/1958 | Pettyjohn et al. |

(Continued)

FOREIGN PATENT DOCUMENTS

| CA | 966660 | 4/1975 |
| CA | 1003217 | 1/1977 |

(Continued)

OTHER PUBLICATIONS

Asami, K., et al., "Highly Active Iron Catalysts from Ferric Chloride or the Steam Gasification of Brown Coal," ind. Eng. Chem. Res., vol. 32, No. 8, 1993, pp. 1631-1636.

(Continued)

Primary Examiner — Wayne Langel
Assistant Examiner — Syed Iqbal
(74) Attorney, Agent, or Firm — McDonnell Boehnen Hulbert & Berghoff LLP

(57) ABSTRACT

Processes for the generation of steam are provided for use in an integrated catalytic gasification process for converting carbonaceous materials to combustible gases, such as methane. Generally, the exhaust gas from a steam generating reactor is provided along with steam, a carbonaceous feedstock, and a gasification catalyst, to a catalytic gasifier, wherein under appropriate temperature and pressure conditions, the carbonaceous feedstock is converted into a plurality of product gases, including, but not limited to, methane, carbon monoxide, hydrogen, and carbon dioxide. As substantially all the carbon dioxide produced from the steam generation process and the gasification process are subsequently directed though gas purification and separation processes, substantially all the carbon dioxide may be recovered, yielding a process having a near zero carbon footprint.

20 Claims, 1 Drawing Sheet

U.S. PATENT DOCUMENTS

| | | | |
|---|---|---|---|
| 2,886,405 A | 5/1959 | Benson et al. |
| 3,034,848 A | 5/1962 | King |
| 3,114,930 A | 12/1963 | Oldham et al. |
| 3,164,330 A | 1/1965 | Neidl |
| 3,351,563 A | 11/1967 | Negra et al. |
| 3,435,590 A | 4/1969 | Smith |
| 3,531,917 A | 10/1970 | Grunewald et al. |
| 3,544,291 A | 12/1970 | Schlinger et al. |
| 3,594,985 A | 7/1971 | Ameen et al. |
| 3,615,300 A | 10/1971 | Holm et al. |
| 3,689,240 A | 9/1972 | Aldridge et al. |
| 3,740,193 A | 6/1973 | Aldridge et al. |
| 3,746,522 A | 7/1973 | Donath |
| 3,759,036 A | 9/1973 | White |
| 3,779,725 A | 12/1973 | Hegarty et al. |
| 3,814,725 A | 6/1974 | Zimmerman et al. |
| 3,817,725 A | 6/1974 | Sieg et al. |
| 3,828,474 A | 8/1974 | Quartulli |
| 3,833,327 A | 9/1974 | Pitzer et al. |
| 3,847,567 A | 11/1974 | Kalina et al. |
| 3,876,393 A | 4/1975 | Kasai et al. |
| 3,904,386 A | 9/1975 | Graboski et al. |
| 3,915,670 A | 10/1975 | Lacey et al. |
| 3,920,229 A | 11/1975 | Piggott |
| 3,929,431 A | 12/1975 | Koh et al. |
| 3,958,957 A | 5/1976 | Koh et al. |
| 3,966,875 A | 6/1976 | Bratzler et al. |
| 3,969,089 A | 7/1976 | Moss et al. |
| 3,971,639 A | 7/1976 | Matthews |
| 3,972,693 A | 8/1976 | Wiesner et al. |
| 3,975,168 A | 8/1976 | Gorbaty |
| 3,985,519 A | 10/1976 | Kalina et al. |
| 3,989,811 A | 11/1976 | Hill |
| 3,996,014 A | 12/1976 | Muller et al. |
| 3,998,607 A | 12/1976 | Wesswlhoft et al. |
| 3,999,607 A | 12/1976 | Pennington et al. |
| 4,005,996 A | 2/1977 | Hausberger et al. |
| 4,011,066 A | 3/1977 | Bratzler et al. |
| 4,017,272 A | 4/1977 | Anwer et al. |
| 4,021,370 A | 5/1977 | Harris et al. |
| 4,025,423 A | 5/1977 | Stonner et al. |
| 4,044,098 A | 8/1977 | Miller et al. |
| 4,046,523 A | 9/1977 | Kalina et al. |
| 4,052,176 A | 10/1977 | Child et al. |
| 4,053,554 A | 10/1977 | Reed et al. |
| 4,057,512 A | 11/1977 | Vadovic et al. |
| 4,069,304 A | 1/1978 | Starkovish et al. |
| 4,077,778 A | 3/1978 | Nahas et al. |
| 4,091,073 A | 5/1978 | Winkler |
| 4,092,125 A | 5/1978 | Stambaugh et al. |
| 4,094,650 A * | 6/1978 | Koh et al. .................. 48/197 R |
| 4,100,256 A | 7/1978 | Bozzelli et al. |
| 4,101,449 A | 7/1978 | Noda et al. |
| 4,104,201 A | 8/1978 | Banks et al. |
| 4,113,615 A | 9/1978 | Gorbaty |
| 4,116,996 A | 9/1978 | Huang |
| 4,118,204 A | 10/1978 | Eakman et al. |
| 4,152,119 A | 5/1979 | Schulz |
| 4,157,246 A | 6/1979 | Eakman et al. |
| 4,159,195 A | 6/1979 | Clavenna |
| 4,162,902 A | 7/1979 | Wiesner et al. |
| 4,173,465 A | 11/1979 | Meissner et al. |
| 4,189,307 A | 2/1980 | Marion |
| 4,193,771 A | 3/1980 | Sharp et al. |
| 4,193,772 A | 3/1980 | Sharp |
| 4,200,439 A | 4/1980 | Lang |
| 4,204,843 A | 5/1980 | Neavel |
| 4,211,538 A | 7/1980 | Eakman et al. |
| 4,211,669 A | 7/1980 | Eakman et al. |
| 4,219,338 A | 8/1980 | Wolfs et al. |
| 4,225,457 A | 9/1980 | Schulz |
| 4,235,044 A | 11/1980 | Cheung |
| 4,243,639 A | 1/1981 | Haas et al. |
| 4,249,471 A | 2/1981 | Gunnerman |
| 4,252,771 A | 2/1981 | Lagana et al. |
| 4,260,421 A | 4/1981 | Brown et al. |
| 4,265,868 A | 5/1981 | Kamody |
| 4,270,937 A | 6/1981 | Adler et al. |
| 4,284,416 A | 8/1981 | Nahas |
| 4,292,048 A | 9/1981 | Wesselhoft et al. |
| 4,298,584 A | 11/1981 | Makrides |
| 4,315,753 A | 2/1982 | Bruckenstein et al. |
| 4,315,758 A | 2/1982 | Patel et al. |
| 4,318,712 A * | 3/1982 | Lang et al. ...................... 48/202 |
| 4,322,222 A | 3/1982 | Sass |
| 4,330,305 A | 5/1982 | Kuessner et al. |
| 4,331,451 A | 5/1982 | Isogaya et al. |
| 4,334,893 A | 6/1982 | Lang |
| 4,336,034 A | 6/1982 | Lang et al. |
| 4,336,233 A | 6/1982 | Appl et al. |
| 4,344,486 A | 8/1982 | Parrish |
| 4,347,063 A | 8/1982 | Sherwood et al. |
| 4,348,486 A | 9/1982 | Calvin et al. |
| 4,348,487 A | 9/1982 | Goldstein et al. |
| 4,353,713 A | 10/1982 | Cheng |
| 4,365,975 A | 12/1982 | Williams et al. |
| 4,372,755 A | 2/1983 | Tolman et al. |
| 4,375,362 A | 3/1983 | Moss |
| 4,397,656 A | 8/1983 | Ketkar |
| 4,400,182 A | 8/1983 | Davies et al. |
| 4,407,206 A | 10/1983 | Bartok et al. |
| 4,428,535 A | 1/1984 | Venetucci |
| 4,432,773 A | 2/1984 | Euker, Jr. et al. |
| 4,433,065 A | 2/1984 | Van Der Burgt et al. |
| 4,436,028 A | 3/1984 | Wilder |
| 4,436,531 A | 3/1984 | Estabrook et al. |
| 4,439,210 A | 3/1984 | Lancet |
| 4,444,568 A | 4/1984 | Beisswenger et al. |
| 4,459,138 A | 7/1984 | Soung |
| 4,462,814 A | 7/1984 | Holmes et al. |
| 4,466,828 A | 8/1984 | Tamai et al. |
| 4,468,231 A | 8/1984 | Bartok et al. |
| 4,478,425 A | 10/1984 | Benko |
| 4,478,725 A | 10/1984 | Velling et al. |
| 4,482,529 A | 11/1984 | Chen et al. |
| 4,491,609 A | 1/1985 | Degel et al. |
| 4,497,784 A | 2/1985 | Diaz |
| 4,500,323 A | 2/1985 | Siegfried et al. |
| 4,505,881 A | 3/1985 | Diaz |
| 4,508,544 A | 4/1985 | Moss |
| 4,508,693 A | 4/1985 | Diaz |
| 4,515,604 A | 5/1985 | Eisenlohr et al. |
| 4,515,764 A | 5/1985 | Diaz |
| 4,524,050 A | 6/1985 | Chen et al. |
| 4,540,681 A | 9/1985 | Kustes et al. |
| 4,541,841 A | 9/1985 | Reinhardt |
| 4,551,155 A | 11/1985 | Wood et al. |
| 4,558,027 A | 12/1985 | McKee et al. |
| 4,572,826 A | 2/1986 | Moore |
| 4,594,140 A | 6/1986 | Cheng |
| 4,597,775 A | 7/1986 | Billimoria et al. |
| 4,597,776 A | 7/1986 | Ullman et al. |
| 4,604,105 A | 8/1986 | Aquino et al. |
| 4,609,388 A | 9/1986 | Adler et al. |
| 4,609,456 A | 9/1986 | Deschamps et al. |
| 4,617,027 A | 10/1986 | Lang |
| 4,619,864 A | 10/1986 | Hendrix et al. |
| 4,620,421 A | 11/1986 | Brown et al. |
| 4,661,237 A | 4/1987 | Kimura et al. |
| 4,668,428 A | 5/1987 | Najjar |
| 4,668,429 A | 5/1987 | Najjar |
| 4,675,035 A | 6/1987 | Apffel |
| 4,678,480 A | 7/1987 | Heinrich et al. |
| 4,682,986 A | 7/1987 | Lee et al. |
| 4,690,814 A | 9/1987 | Velenyi et al. |
| 4,699,632 A | 10/1987 | Babu et al. |
| 4,704,136 A | 11/1987 | Weston et al. |
| 4,720,289 A | 1/1988 | Vaugh et al. |
| 4,747,938 A | 5/1988 | Khan |
| 4,781,731 A | 11/1988 | Schlinger |
| 4,803,061 A | 2/1989 | Najjar et al. |
| 4,808,194 A | 2/1989 | Najjar et al. |
| 4,810,475 A | 3/1989 | Chu et al. |
| 4,822,935 A | 4/1989 | Scott |
| 4,848,983 A | 7/1989 | Tomita et al. |
| 4,854,944 A | 8/1989 | Strong |
| 4,861,346 A | 8/1989 | Najjar et al. |

| Patent/Publication | Date | Inventor |
|---|---|---|
| 4,861,360 A | 8/1989 | Apffel |
| 4,872,886 A | 10/1989 | Henley et al. |
| 4,876,080 A | 10/1989 | Paulson |
| 4,892,567 A | 1/1990 | Yan |
| 4,960,450 A | 10/1990 | Schwarz et al. |
| 4,995,193 A | 2/1991 | Soga et al. |
| 5,017,282 A | 5/1991 | Delbianco et al. |
| 5,055,181 A | 10/1991 | Maa et al. |
| 5,057,294 A | 10/1991 | Sheth et al. |
| 5,059,406 A | 10/1991 | Sheth et al. |
| 5,093,094 A | 3/1992 | Van Kleeck et al. |
| 5,094,737 A | 3/1992 | Bearden, Jr. et al. |
| 5,132,007 A | 7/1992 | Meyer et al. |
| 5,223,173 A | 6/1993 | Jeffrey |
| 5,236,557 A | 8/1993 | Muller et al. |
| 5,250,083 A | 10/1993 | Wolfenbarger et al. |
| 5,277,884 A | 1/1994 | Shinnar et al. |
| 5,435,940 A | 7/1995 | Doering et al. |
| 5,536,893 A | 7/1996 | Gudmundsson |
| 5,616,154 A | 4/1997 | Elliott et al. |
| 5,630,854 A | 5/1997 | Sealock, Jr. et al. |
| 5,641,327 A | 6/1997 | Leas |
| 5,660,807 A | 8/1997 | Forg et al. |
| 5,670,122 A | 9/1997 | Zamansky et al. |
| 5,720,785 A | 2/1998 | Baker |
| 5,733,515 A | 3/1998 | Doughty et al. |
| 5,769,165 A | 6/1998 | Bross et al. |
| 5,776,212 A | 7/1998 | Leas |
| 5,788,724 A | 8/1998 | Carugati et al. |
| 5,855,631 A | 1/1999 | Leas |
| 5,865,898 A | 2/1999 | Holtzapple et al. |
| 5,968,465 A | 10/1999 | Koveal et al. |
| 6,013,158 A | 1/2000 | Wootten |
| 6,015,104 A | 1/2000 | Rich, Jr. |
| 6,028,234 A | 2/2000 | Heinemann et al. |
| 6,090,356 A | 7/2000 | Jahnke et al. |
| 6,132,478 A | 10/2000 | Tsurui et al. |
| 6,180,843 B1 | 1/2001 | Heinemann et al. |
| 6,187,465 B1 | 2/2001 | Galloway |
| 6,379,645 B1 | 4/2002 | Bucci et al. |
| 6,389,820 B1 | 5/2002 | Rogers et al. |
| 6,506,349 B1 | 1/2003 | Khanmamedov |
| 6,506,361 B1 | 1/2003 | Machado et al. |
| 6,602,326 B2 | 8/2003 | Lee et al. |
| 6,641,625 B1 | 11/2003 | Clawson et al. |
| 6,653,516 B1 | 11/2003 | Yoshikawa et al. |
| 6,692,711 B1 | 2/2004 | Alexion et al. |
| 6,790,430 B1 | 9/2004 | Lackner et al. |
| 6,797,253 B2 | 9/2004 | Lyon |
| 6,808,543 B2 | 10/2004 | Paisley |
| 6,830,597 B1 * | 12/2004 | Green .................. 48/209 |
| 6,855,852 B1 | 2/2005 | Jackson et al. |
| 6,878,358 B2 | 4/2005 | Vosteen et al. |
| 6,894,183 B2 | 5/2005 | Choudhary et al. |
| 6,955,595 B2 | 10/2005 | Kim |
| 6,955,695 B2 | 10/2005 | Nahas |
| 6,969,494 B2 | 11/2005 | Herbst |
| 7,074,373 B1 | 7/2006 | Warren et al. |
| 7,118,720 B1 | 10/2006 | Mendelsohn et al. |
| 7,132,183 B2 | 11/2006 | Galloway |
| 7,205,448 B2 | 4/2007 | Gajda et al. |
| 7,220,502 B2 | 5/2007 | Galloway |
| 7,309,383 B2 | 12/2007 | Beech, Jr. et al. |
| 7,481,275 B2 | 1/2009 | Olsvik et al. |
| 7,666,383 B2 | 2/2010 | Green |
| 7,897,126 B2 | 3/2011 | Rappas et al. |
| 7,901,644 B2 | 3/2011 | Rappas et al. |
| 7,922,782 B2 | 4/2011 | Sheth |
| 7,926,750 B2 | 4/2011 | Hauserman |
| 7,976,593 B2 | 7/2011 | Graham |
| 2002/0036086 A1 | 3/2002 | Minkkinen et al. |
| 2003/0070808 A1 | 4/2003 | Allison |
| 2003/0131582 A1 | 7/2003 | Anderson et al. |
| 2003/0167691 A1 | 9/2003 | Nahas |
| 2004/0020123 A1 | 2/2004 | Kimura et al. |
| 2004/0180971 A1 | 9/2004 | Inoue et al. |
| 2005/0107648 A1 | 5/2005 | Kimura et al. |
| 2005/0137442 A1 | 6/2005 | Gajda et al. |
| 2005/0287056 A1 | 12/2005 | Baker et al. |
| 2006/0228290 A1 | 10/2006 | Green |
| 2006/0265953 A1 | 11/2006 | Hobbs |
| 2007/0000177 A1 | 1/2007 | Hippo et al. |
| 2007/0051043 A1 | 3/2007 | Schingnitz |
| 2007/0083072 A1 | 4/2007 | Nahas |
| 2007/0180990 A1 | 8/2007 | Downs et al. |
| 2007/0186472 A1 | 8/2007 | Rabovister et al. |
| 2007/0220810 A1 | 9/2007 | Leveson et al. |
| 2007/0227729 A1 | 10/2007 | Zubrin et al. |
| 2007/0237696 A1 | 10/2007 | Payton |
| 2007/0277437 A1 | 12/2007 | Sheth |
| 2007/0282018 A1 | 12/2007 | Jenkins |
| 2009/0048476 A1 | 2/2009 | Rappas et al. |
| 2009/0090055 A1 | 4/2009 | Ohtsuka |
| 2009/0090056 A1 | 4/2009 | Ohtsuka |
| 2009/0165361 A1 | 7/2009 | Rappas et al. |
| 2009/0165376 A1 | 7/2009 | Lau et al. |
| 2009/0165379 A1 | 7/2009 | Rappas |
| 2009/0165380 A1 | 7/2009 | Lau et al. |
| 2009/0165381 A1 | 7/2009 | Robinson |
| 2009/0165382 A1 | 7/2009 | Rappas et al. |
| 2009/0165383 A1 | 7/2009 | Rappas et al. |
| 2009/0165384 A1 | 7/2009 | Lau et al. |
| 2009/0166588 A1 | 7/2009 | Spitz et al. |
| 2009/0169448 A1 | 7/2009 | Rappas et al. |
| 2009/0169449 A1 | 7/2009 | Rappas et al. |
| 2009/0170968 A1 | 7/2009 | Nahas et al. |
| 2009/0173079 A1 | 7/2009 | Wallace et al. |
| 2009/0217575 A1 | 9/2009 | Raman et al. |
| 2009/0217582 A1 | 9/2009 | May et al. |
| 2009/0217584 A1 | 9/2009 | Raman et al. |
| 2009/0217585 A1 | 9/2009 | Raman et al. |
| 2009/0217586 A1 | 9/2009 | Rappas et al. |
| 2009/0217587 A1 | 9/2009 | Raman et al. |
| 2009/0217588 A1 | 9/2009 | Hippo et al. |
| 2009/0217589 A1 | 9/2009 | Robinson |
| 2009/0217590 A1 | 9/2009 | Rappas et al. |
| 2009/0218424 A1 | 9/2009 | Hauserman |
| 2009/0220406 A1 | 9/2009 | Rahman |
| 2009/0229182 A1 | 9/2009 | Raman et al. |
| 2009/0236093 A1 | 9/2009 | Zubrin et al. |
| 2009/0246120 A1 | 10/2009 | Raman et al. |
| 2009/0259080 A1 | 10/2009 | Raman et al. |
| 2009/0260287 A1 | 10/2009 | Lau |
| 2009/0324458 A1 | 12/2009 | Robinson et al. |
| 2009/0324459 A1 | 12/2009 | Robinson et al. |
| 2009/0324460 A1 | 12/2009 | Robinson et al. |
| 2009/0324461 A1 | 12/2009 | Robinson et al. |
| 2009/0324462 A1 | 12/2009 | Robinson et al. |
| 2010/0018113 A1 * | 1/2010 | Bohlig et al. .................. 44/550 |
| 2010/0071235 A1 | 3/2010 | Pan et al. |
| 2010/0071262 A1 | 3/2010 | Robinson et al. |
| 2010/0076235 A1 | 3/2010 | Reiling et al. |
| 2010/0120926 A1 | 5/2010 | Robinson et al. |
| 2010/0121125 A1 | 5/2010 | Hippo et al. |
| 2010/0168494 A1 | 7/2010 | Rappas et al. |
| 2010/0168495 A1 | 7/2010 | Rappas et al. |
| 2010/0179232 A1 | 7/2010 | Robinson et al. |
| 2010/0287835 A1 | 11/2010 | Reiling et al. |
| 2010/0287836 A1 | 11/2010 | Robinson et al. |
| 2010/0292350 A1 | 11/2010 | Robinson et al. |
| 2011/0031439 A1 | 2/2011 | Sirdeshpande et al. |
| 2011/0062012 A1 | 3/2011 | Robinson |
| 2011/0062721 A1 | 3/2011 | Sirdeshpande et al. |
| 2011/0062722 A1 | 3/2011 | Sirdeshpande et al. |
| 2011/0064648 A1 | 3/2011 | Preston et al. |
| 2011/0088896 A1 | 4/2011 | Preston |
| 2011/0088897 A1 | 4/2011 | Raman |
| 2011/0146978 A1 | 6/2011 | Perlman |
| 2011/0146979 A1 | 6/2011 | Wallace |
| 2011/0207002 A1 | 8/2011 | Powell et al. |
| 2011/0217602 A1 | 9/2011 | Sirdeshpande |
| 2011/0262323 A1 | 10/2011 | Rappas et al. |
| 2012/0046510 A1 | 2/2012 | Sirdeshpande |
| 2012/0060417 A1 | 3/2012 | Raman et al. |
| 2012/0102836 A1 | 5/2012 | Raman et al. |
| 2012/0102837 A1 | 5/2012 | Raman et al. |

FOREIGN PATENT DOCUMENTS

| | | |
|---|---|---|
| CA | 1041553 | 10/1978 |
| CA | 1106178 | 8/1981 |
| CA | 1 125 026 | 6/1982 |
| CA | 1187702 | 6/1985 |
| CA | 2713642 | 7/2009 |
| CN | 1477090 | 2/2004 |
| CN | 101555420 | 10/2009 |
| DE | 2 210 891 | 3/1972 |
| DE | 2210891 | 9/1972 |
| DE | 2852710 | 6/1980 |
| DE | 3422202 | 12/1985 |
| DE | 100610607 | 6/2002 |
| EA | 819 | 4/2000 |
| EP | 0024792 | 3/1981 |
| EP | 0 067 580 | 12/1982 |
| EP | 102828 | 3/1984 |
| EP | 0 138 463 | 4/1985 |
| EP | 0 225 146 | 6/1987 |
| EP | 0 259 927 | 3/1988 |
| EP | 0473153 | 3/1992 |
| EP | 0 723 930 | 7/1996 |
| EP | 1 001 002 | 5/2000 |
| EP | 1 207 132 | 5/2002 |
| EP | 1 741 673 | 6/2006 |
| EP | 1768207 | 3/2007 |
| EP | 2058471 | 5/2009 |
| FR | 797 089 | 4/1936 |
| FR | 2 478 615 | 9/1981 |
| FR | 2906879 | 4/2008 |
| GB | 593910 | 10/1947 |
| GB | 640907 | 8/1950 |
| GB | 676615 | 7/1952 |
| GB | 701 131 | 12/1953 |
| GB | 760627 | 11/1956 |
| GB | 798741 | 7/1958 |
| GB | 820 257 | 9/1959 |
| GB | 996327 | 6/1965 |
| GB | 1033764 | 6/1966 |
| GB | 1448562 | 9/1976 |
| GB | 1453081 | 10/1976 |
| GB | 1467219 | 3/1977 |
| GB | 1467995 | 3/1977 |
| GB | 1 599 932 | 7/1977 |
| GB | 1560873 | 2/1980 |
| GB | 2078251 | 1/1982 |
| GB | 2154600 | 9/1985 |
| GB | 2455864 | 6/2009 |
| JP | 53-94305 | 8/1978 |
| JP | 53-111302 | 9/1978 |
| JP | 54020003 | 2/1979 |
| JP | 54-150402 | 11/1979 |
| JP | 55-12181 | 1/1980 |
| JP | 56-145982 | 11/1981 |
| JP | 56157493 | 12/1981 |
| JP | 60-35092 | 2/1985 |
| JP | 60-77938 | 5/1985 |
| JP | 62241991 | 10/1987 |
| JP | 62 257985 | 11/1987 |
| JP | 2000290659 | 10/2000 |
| JP | 2000290670 | 10/2000 |
| JP | 2002105467 | 4/2002 |
| JP | 2004292200 | 10/2004 |
| JP | 2004298818 | 10/2004 |
| JP | 2006 169476 A | 6/2006 |
| WO | 00/18681 | 4/2000 |
| WO | WO 00/43468 | 7/2000 |
| WO | WO 02/40768 | 5/2002 |
| WO | WO 02/079355 | 10/2002 |
| WO | 02/103157 | 12/2002 |
| WO | 03/018958 | 3/2003 |
| WO | WO 03/033624 | 4/2003 |
| WO | 2004/055323 | 7/2004 |
| WO | WO 2004/072210 | 8/2004 |
| WO | WO 2006/031011 | 3/2006 |
| WO | WO 2007/005284 | 1/2007 |
| WO | WO 2007/047210 | 4/2007 |
| WO | 2007/068682 | 6/2007 |
| WO | 2007/077137 | 7/2007 |
| WO | 2007/077138 | 7/2007 |
| WO | 2007/083072 | 7/2007 |
| WO | WO 2007/076363 | 7/2007 |
| WO | WO 2007/128370 | 11/2007 |
| WO | 2007/143376 | 12/2007 |
| WO | WO 2007/143376 | 12/2007 |
| WO | 2008/058636 | 5/2008 |
| WO | WO 2008/073889 | 6/2008 |
| WO | 2008/087154 | 7/2008 |
| WO | 2009/018053 | 2/2009 |
| WO | WO 2009/018053 | 2/2009 |
| WO | WO 2009/048723 | 4/2009 |
| WO | WO 2009/048724 | 4/2009 |
| WO | WO 2009/086361 | 7/2009 |
| WO | WO 2009/086362 | 7/2009 |
| WO | WO 2009/086363 | 7/2009 |
| WO | WO 2009/086366 | 7/2009 |
| WO | WO 2009/086367 | 7/2009 |
| WO | WO 2009/086370 | 7/2009 |
| WO | WO 2009/086372 | 7/2009 |
| WO | WO 2009/086374 | 7/2009 |
| WO | WO 2009/086377 | 7/2009 |
| WO | WO 2009/086383 | 7/2009 |
| WO | WO 2009/086407 | 7/2009 |
| WO | WO 2009/086408 | 7/2009 |
| WO | WO 2009/111330 | 9/2009 |
| WO | WO 2009/111331 | 9/2009 |
| WO | WO 2009/111332 | 9/2009 |
| WO | WO 2009/111335 | 9/2009 |
| WO | WO 2009/111342 | 9/2009 |
| WO | WO 2009/111345 | 9/2009 |
| WO | WO 2009/124017 | 10/2009 |
| WO | WO 2009/124019 | 10/2009 |
| WO | WO 2009/158576 | 12/2009 |
| WO | WO 2009/158579 | 12/2009 |
| WO | WO 2009/158580 | 12/2009 |
| WO | WO 2009/158582 | 12/2009 |
| WO | WO 2009/158583 | 12/2009 |
| WO | WO 2010/033846 | 3/2010 |
| WO | WO 2010/033848 | 3/2010 |
| WO | WO 2010/033850 | 3/2010 |
| WO | WO 2010/033852 | 3/2010 |
| WO | WO 2010/048493 | 4/2010 |
| WO | WO 2010/078297 | 7/2010 |
| WO | WO 2010/078298 | 7/2010 |
| WO | WO 2010/132551 | 11/2010 |
| WO | 2011/029278 | 3/2011 |
| WO | 2011/029282 | 3/2011 |
| WO | 2011/029283 | 3/2011 |
| WO | 2011/029284 | 3/2011 |
| WO | 2011/029285 | 3/2011 |
| WO | WO 2011/034890 | 3/2011 |
| WO | 2011/063608 | 6/2011 |
| WO | WO 2012/024369 | 2/2012 |

OTHER PUBLICATIONS

Berger, R., et al., "High Temperature $CO_2$-Absorption: A Process Offering New Prospects in Fuel Chemistry," The Fifth International Symposium on Coal Combustion, Nov. 2003, Nanjing, China, pp. 547-549.

Brown et al., "Biomass-Derived Hydrogen From a Thermally Ballasted Gasifier," Aug. 2005.

Brown et al., "Biomass-Derived Hydrogen From a Thermally Ballasted Gasifier," DOE Hydrogen Program Contractors' Review Metting, Center for Sustainable Environmental Technologies, Iowa State University, May 21, 2003.

Cohen, S.J., Project Manager, "Large Pilot Plant Alternatives for Scaleup of the Catalytic Coal Gasification Process," FE-2480-20, U.S. Dept. of Energy, Contract No. EX-76-C-01-2480, 1979.

Euker, Jr., C.A., Reitz, R.A., Program Managers, "Exxon Catalytic Coal-Gasification-Process Development Program," Exxon Research & Engineering Company, FE-2777-31, U.S. Dept. of Energy, Contract No. ET-78-C-01-2777, 1981.

Kalina, T., Nahas, N.C., Project Managers, "Exxon Catalytic Coal Gasification Process Predevelopment Program," Exxon Research & Engineering Company, FE-2369-24, U.S. Dept. of Energy, Contract No. E(49-18)-2369, 1978.

Nahas, N.C., "Exxon Catalytic Coal Gasification Process—Fundamentals to Flowsheets," Fuel, vol. 62, No. 2, 1983, pp. 239-241.

Ohtsuka, Y. et al., "Highly Active Catalysts from Inexpensive Raw Materials for Coal Gasification," Catalysis Today, vol. 39, 1997, pp. 111-125.

Ohtsuka, Yasuo et al, "Steam Gasification of Low-Rank Coals with a Chlorine-Free Iron Catalyst from Ferric Chloride," Ind. Eng. Chem. Res., vol. 30, No. 8, 1991, pp. 1921-1926.

Ohtsuka, Yasuo et al., "Calcium Catalysed Steam Gasification of Yalourn Brown Coal," Fuel, vol. 65, 1986, pp. 1653-1657.

Ohtsuka, Yasuo, et al, "Iron-Catalyzed Gasification of Brown Coal at Low Temperatures," Energy & Fuels, vol. 1, No. 1, 1987, pp. 32-36.

Ohtsuka, Yasuo, et al., "Ion-Exchanged Calcium From Calcium Carbonate and Low-Rank Coals: High Catalytic Activity in Steam Gasification," Energy & Fuels 1996, 10, pp. 431-435.

Ohtsuka, Yasuo et al., "Steam Gasification of Coals with Calcium Hydroxide," Energy & Fuels, vol. 9, No. 6, 1995, pp. 1038-1042.

Pereira, P., et al., "Catalytic Steam Gasification of Coals," Energy & Fuels, vol. 6, No. 4, 1992, pp. 407-410.

Ruan Xiang-Quan, et al., "Effects of Catalysis on Gasification of Tatong Coal Char," Fuel, vol. 66, Apr. 1987, pp. 568-571.

Tandon, D., "Low Temperature and Elevated Pressure Steam Gasification of Illinois Coal," College of Engineering in the Graduate School, Southern Illinois university at Carbondale, Jun. 1996.

U.S. Appl. No. 12/778,538, filed May 12, 2010, Robinson, et al.
U.S. Appl. No. 12/778,548, filed May 12, 2010, Robinson, et al.
U.S. Appl. No. 12/778,552, filed May 12, 2010, Robinson, et al.

Coal Data: A Reference, Energy Information Administration, Office of Coal, Nuclear, Electric, and Alternate Fuels U.S. Department of Energy, DOE/EIA-0064(93), Feb. 1995.

Deepak Tandon, Dissertation Approval, "Low Temperature and Elevated Pressure Steam Gasification of Illinois Coal", Jun. 13, 1996.

Demibras, "Demineralization of Agricultural Residues by Water Leaching", *Energy Sources*, vol. 25, pp. 679-687, (2003).

Gallagher Jr., et al., "Catalytic Coal Gasification for SNG Manufacture", *Energy Research*, vol. 4, pp. 137-147, (1980).

Heinemann, et al., "Fundamental and Exploratory Studies of Catalytic Steam Gasification of Carbonaceous Materials", Final Report Fiscal Years 1985-1994.

Jensen, et al. Removal of K and Cl by leaching of straw char, *Biomass and Bioenergy*, vol. 20, pp. 447-457, (2001).

Mengjie, et al., "A potential renewable energy resource development and utilization of biomass energy", http://www.foa.org.docrep/T4470E/t4470e0n.htm, pp. 1-8.

Meyers, et al. Fly Ash as a Construction Material for Highways, A Manual. Federal Highway Administration, Report No. FHWA-IP-76-16, Washington, DC, 1976.

Natural Gas Processing: The Crucial Link Between Natural Gas Production and Its Transportation to Market. Energy Information Administration, Office of Oil and Gas; pp. 1-11, (2006).

Prins, et al., "Exergetic optimisation of a production process of Fischer-Tropsch fuels from biomass", *Fuel Processing Technology*, vol. 86, pp. 375-389, (2004).

Moulton, Lyle K. "Bottom Ash and Boiler Slag", *Proceedings of the Third International Ash Utilization Symposium*, U.S. Bureau of Mines, Information Circular No. 8640, Washington, DC, 1973.

Gerdes, Kristin, et al., "Integrated Gasification Fuel Cell Performance and Cost Assessment," National Energy Technology Laboratory, U.S. Department of Energy, Mar. 27, 2009, pp. 1-26.

Ghosh, S., et al., "Energy Analysis of a Cogeneration Plant Using Coal Gasification and Solid Oxide Fuel Cell," Energy, 2006, vol. 31, No. 2-3, pp. 345-363.

Jeon, S.K., et al., "Characteristics of Steam Hydrogasification of Wood Using a Micro-Batch Reactor," Fuel, 2007, vol. 86, pp. 2817-2823.

Li, Mu, et al., "Design of Highly Efficient Coal-Based Integrated Gasification Fuel Cell Power Plants," Journal of Power Sources, 2010, vol. 195, pp. 5707-5718.

Prins, M.J., et al., "Exergetic Optimisation of a Production Process of Fischer-Tropsch Fuels from Biomass," Fuel Processing Technology, 2005, vol. 86, No. 4, pp. 375-389.

U.S. Appl. No. 13/484,918, filed May 31, 2012.
U.S. Appl. No. 13/402,022, filed Feb. 22, 2012.
U.S. Appl. No. 13/450,995, filed Apr. 19, 2012.

A.G. Collot et al., "Co-pyrolysis and co-gasification of coal and biomass in bench-scale fixed-bed and fluidized bed reactors", (1999) Fuel 78, pp. 667-679.

Wenkui Zhu et al., "Catalytic gasification of char from co-pyrolysis of coal and biomass", (2008) Fuel Processing Technology, vol. 89, pp. 890-896.

Chiesa P. et al., "Co-Production of hydrogen, electricity and C02 from coal with commercially ready technology. Part A: Performance and emissions", (2005) International Journal of Hydrogen Energy, vol. 30, No. 7, pp. 747-767.

Brown et al., "Biomass-Derived Hydrogen From a Thermally Ballasted Gasifier", DOE Hydrogen Program Contractors' Review meeting, May 18-21, 2003, Center for Sustainable Environmental Technologies Iowa State University.

Brown et al., "Biomass-Derived Hydrogen From a thermally Ballasted Gasifier", Final Technical Report, Iowa State University, Aug. 2005.

Chiaramonte et al, "Upgrade Coke by Gasification", (1982) Hydrocarbon Processing, vol. 61 (9), pp. 255-257 (Abstract only).

Adsorption, http://en.wikipedia.org/wiki/Adsorption, pp. 1-8 (Oct. 17, 2007).

Amine gas treating, http://en.wikipedia.org/wiki/Acid_gas_removal, pp. 1-4 (Oct. 21, 2007).

Coal, http://en.wikipedia.org/wiki/Coal_gasification, pp. 1-8 (Oct. 29, 2007).

Fluidized Bed Gasifiers, http://www.energyproducts.com/fluidized_bed_gasifiers.htm, pp. 1-5 (Oct. 24, 2007).

Gas separation, http://en.wikipedia.org/wiki/Gas_separation, pp. 1-2 (Feb. 24, 2007).

Gasification, http://en.wikipedia.org/wiki/Gasification, pp. 1-6 (Oct. 29, 2007).

Mengjie et al., "A potential renewable energy resource development and utilization of biomass enery", http://www.fao.org.docrep/T4470E/t4470e0n.htm, pp. 1-8 (1994).

Natural gas processing http://en.wikipedia.org/wiki/Natural_gas_processing, pp. 1-4 (Oct. 22, 2007).

Reboiler, http://en.wikipedia.org/wiki/Reboiler, pp. 1-4 (Nov. 11, 2007).

What is XPS?, http://www.nuance.northwestern.edu/KeckII/xps1.asp, pp. 1-2 (2006).

2.3 Types of gasifiers, http://www.fao.org/docrep/t0512e/T0512e0a.htm, pp. 1-6 (1986).

2.4 Gasification fuels, http://www.fao.org/docrep/t0512e/T0512e0b.htm#TopofPage, pp. 1-8 (1986).

2.5 Design of downdraught gasifiers, http://www.fao.org/docrep/t0512e/T0512e0c.htm#TopOfPage, pp. 1-8 (1986).

2.6 Gas cleaning and cooling, http://www.fao.org/docrep/t0512e0d.htm#TopOFPage, pp. 1-3 (1986).

\* cited by examiner

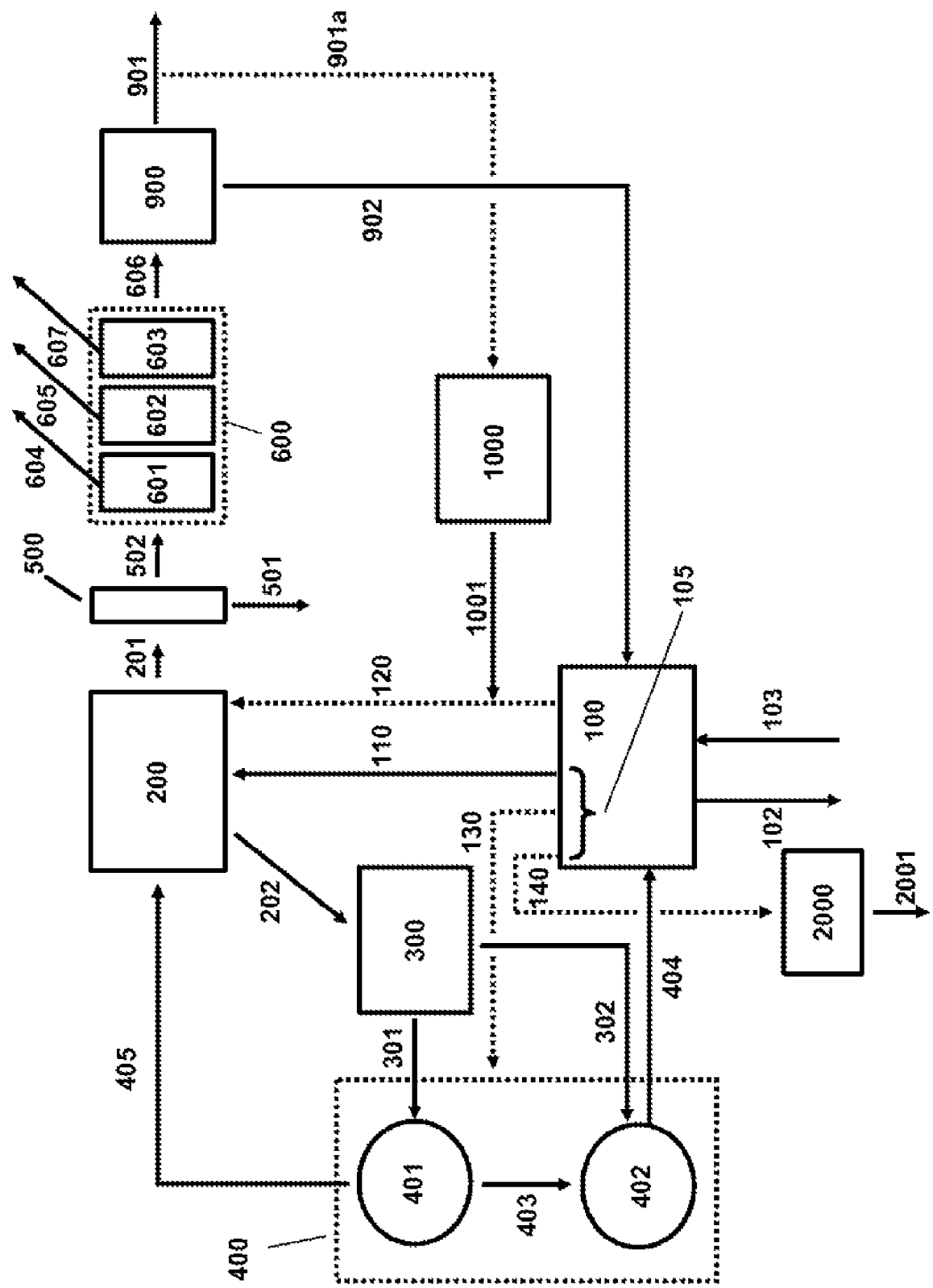

REDUCED CARBON FOOTPRINT STEAM GENERATION PROCESSES

CROSS-REFERENCE TO RELATED APPLICATIONS

This application claims priority under 35 U.S.C. §119 from U.S. Provisional Application Ser. No. 61/032,736 (filed Feb. 29, 2008), the disclosure of which is incorporated by reference herein for all purposes as if fully set forth.

FIELD OF THE INVENTION

The present invention relates to methods for the production of steam for a catalytic gasification reactor which have a reduced carbon footprint.

BACKGROUND OF THE INVENTION

In view of numerous factors such as higher energy prices and environmental concerns, the production of value-added gaseous products from lower-fuel-value carbonaceous feedstocks, such as biomass, coal and petroleum coke, is receiving renewed attention. The catalytic gasification of such materials to produce methane and other value-added gases is disclosed, for example, in U.S. Pat. Nos. 3,828,474, 3,998,607, 4,057,512, 4,092,125, 4,094,650, 4,204,843, 4,468,231, 4,500,323, 4,541,841, 4,551,155, 4,558,027, 4,606,105, 4,617,027, 4,609,456, 5,017,282, 5,055,181, 6,187,465, 6,790,430, 6,894,183, 6,955,695, US2003/0167961A1, US2006/0265953A1, US2007/000177A1, US2007/083072A1, US2007/0277437A1 and GB 1599932.

The process for the catalytic gasification of a carbonaceous material to synthetic natural gas requires the presence of steam to react with carbon to generate methane and carbon dioxide. It has generally been contemplated to utilize coal-fired boilers to generate the required steam. Such methods have the disadvantages of requiring an additional fuel source for the boiler, while producing an exhaust comprising carbon dioxide, which is either exhausted to the atmosphere or otherwise sequestered. As such, there exists a need in the art to develop processes for the catalytic gasification of carbonaceous materials to synthetic natural gas which more efficiently utilize fuels sources, including those utilized for generating steam, while decreasing the carbon footprint of the overall process.

SUMMARY OF THE INVENTION

In a first aspect, the present invention provides a process for generating steam and a plurality of gaseous products from a carbonaceous feedstock and recovering carbon dioxide, the process comprising the steps of: (a) supplying a first carbonaceous feedstock to a reactor, the reactor in communication with a gasifier; (b) at least partially combusting the first carbonaceous feedstock in the reactor to generate (i) heat energy and (ii) a first gas stream comprising carbon dioxide; (c) utilizing the heat energy to generate steam; (d) introducing at least a portion of the steam, the first gas stream, a second carbonaceous feedstock, and an alkali metal gasification catalyst to the gasifier; (e) reacting the second carbonaceous feedstock in the gasifier in the presence of the steam and the alkali metal gasification catalyst and under suitable temperature and pressure to form a second gas stream comprising a plurality of gaseous products comprising methane, carbon dioxide and at least one or more of hydrogen, carbon monoxide, hydrogen sulfide, ammonia and other higher hydrocarbons; (f) at least partially separating the plurality of gaseous products to produce (i) a third gas stream comprising carbon dioxide and (ii) a fourth gas stream comprising a predominant amount of one of the gaseous products other than carbon dioxide; (g) recovering the third gas stream; and (h) recovering the fourth gas stream, wherein the third gas stream includes carbon dioxide formed in steps (b) and (e).

In a second aspect, the present invention provides a process for generating steam, electricity and a plurality of gaseous products from a carbonaceous feedstock, and recovering carbon dioxide, the process comprising the steps of: (a) supplying a first carbonaceous feedstock to a reactor, the reactor in communication with a gasifier; (b) at least partially combusting the first carbonaceous feedstock in the reactor to generate (i) heat energy and (ii) a first gas stream comprising carbon dioxide; (c) contacting water with the heat energy to generate steam; (d) dividing the steam into a first steam stream and a second steam stream; (e) introducing the first steam stream, the first gas stream, a second carbonaceous feedstock, and an alkali metal gasification catalyst to the gasifier; (f) introducing the second steam stream to a steam turbine to generate electricity; (g) reacting the second carbonaceous feedstock in the gasifier in the presence of the steam and the alkali metal gasification catalyst and under suitable temperature and pressure to form a second gas stream comprising a plurality of gaseous products comprising methane, carbon dioxide and at least one or more of hydrogen, carbon monoxide, hydrogen sulfide, ammonia and other higher hydrocarbons; (h) at least partially separating the plurality of gaseous products to produce (i) a third gas stream comprising carbon dioxide and (ii) a fourth gas stream comprising a predominant amount of one of the gaseous products other than carbon dioxide; (i) recovering the third gas stream; and (j) recovering the fourth gas stream, wherein the third gas stream includes carbon dioxide formed in steps (b) and (g).

BRIEF DESCRIPTION OF THE DRAWINGS

FIG. 1 is a flow chart illustrating a method for generating gases from a carbonaceous feedstock according to the present invention.

DETAILED DESCRIPTION

The present invention relates to methods for generating high-pressure and high-temperature steam for providing to a catalytic gasification reactor, which methods result in reduced to near zero carbon footprints due to the capture of the carbon dioxide (and substantially all of the carbon dioxide) produced in the process. Such methods can be integrated into processes for the catalytic gasification of carbonaceous feedstock and/or for generating electricity.

The present invention can be practiced, for example, using any of the developments to catalytic gasification technology disclosed in commonly owned US2007/0000177A1, US2007/0083072A1 and US2007/0277437A1; and U.S. patent application Ser. No. 12/178,380 (filed 23 Jul. 2008), Ser. No. 12/234,012 (filed 19 Sep. 2008) and Ser. No. 12/234,018 (filed 19 Sep. 2008). All of the above are incorporated by reference herein for all purposes as if fully set forth.

Moreover, the present invention can be practiced in conjunction with the subject matter of the following U.S. patent applications, each of which was filed on Dec. 28, 2008: Ser. No. 12/342,554, entitled "CATALYTIC GASIFICATION PROCESS WITH RECOVERY OF ALKALI METAL FROM CHAR"; Ser. No. 12/342,565, entitled "PETROLEUM COKE COMPOSITIONS FOR CATALYTIC GAS- IFICATION"; Ser. No. 12/342,578, entitled "COAL COMPOSITIONS FOR CATALYTIC GASIFICATION"; Ser. No. 12/342,596, entitled "PROCESSES FOR MAKING SYNTHESIS GAS AND SYNGAS-DERIVED PRODUCTS"; Ser. No. 12/342,608, entitled "PETROLEUM COKE COMPOSITIONS FOR CATALYTIC GASIFICATION"; Ser. No. 12/342,628, entitled "PROCESSES FOR MAKING SYN-GAS-DERIVED PRODUCTS"; Ser. No. 12/342,663, entitled "CARBONACEOUS FUELS AND PROCESSES FOR MAKING AND USING THEM"; Ser. No. 12/342,715, entitled "CATALYTIC GASIFICATION PROCESS WITH RECOVERY OF ALKALI METAL FROM CHAR"; Ser. No. 12/342,736, entitled "CATALYTIC GASIFICATION PROCESS WITH RECOVERY OF ALKALI METAL FROM CHAR"; Ser. No. 12/343,143, entitled "CATALYTIC GASIFICATION PROCESS WITH RECOVERY OF ALKALI METAL FROM CHAR"; Ser. No. 12/343,149, entitled "STEAM GENERATING SLURRY GASIFIER FOR THE CATALYTIC GASIFICATION OF A CARBONACEOUS FEEDSTOCK"; and Ser. No. 12/343,159, entitled "CONTINUOUS PROCESSES FOR CONVERTING CARBONACEOUS FEEDSTOCK INTO GASEOUS PRODUCTS". All of the above are incorporated by reference herein for all purposes as if fully set forth.

Further, the present invention can be practiced in conjunction with the subject matter of the following U.S. patent applications, each of which was filed concurrently herewith: Ser. No. 12/395,293, entitled "PROCESSES FOR MAKING ABSORBENTS AND PROCESSES FOR REMOVING CONTAMINANTS FROM FLUIDS USING THEM" (Ser. No. 12/395,309, entitled "STEAM GENERATION PROCESSES UTILIZING BIOMASS FEEDSTOCKS" Ser. No. 12/395,330, entitled "PROCESS AND APPARATUS FOR THE SEPARATION OF METHANE FROM A GAS STREAM" Ser. No. 12/395,344, entitled "SELECTIVE REMOVAL AND RECOVERY OF ACID GASES FROM GASIFICATION PRODUCTS" Ser. No. 12/395,348, entitled "COAL COMPOSITIONS FOR CATALYTIC GASIFICATION" Ser. No. 12/395,353, entitled "COAL COMPOSITIONS FOR CATALYTIC GASIFICATION" Ser. No. 12/395,372, entitled "CO-FEED OF BIOMASS AS SOURCE OF MAKEUP CATALYSTS FOR CATALYTIC COAL GASIFICATION" Ser. No. 12/395,381, entitled "COMPACTOR-FEEDER" Ser. No.

12/395,385, entitled "CARBONACEOUS FINES RECYCLE" Ser. No. 12/395,429, entitled "BIOMASS CHAR COMPOSITIONS FOR CATALYTIC GASIFICATION" Ser. No. 12/395,433, entitled "CATALYTIC GASIFICATION PARTICULATE COMPOSITIONS" and Ser. No. 12/395,447, entitled "BIOMASS COMPOSITIONS FOR CATALYTIC GASIFICATION" All of the above are incorporated herein by reference for all purposes as if fully set forth.

All publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this invention belongs. In case of conflict, the present specification, including definitions, will control.

Except where expressly noted, trademarks are shown in upper case.

Although methods and materials similar or equivalent to those described herein can be used in the practice or testing of the present invention, suitable methods and materials are described herein.

Unless stated otherwise, all percentages, parts, ratios, etc., are by weight.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present invention be limited to the specific values recited when defining a range.

When the term "about" is used in describing a value or an end-point of a range, the invention should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the invention. This description should be read to include one or at least one and the singular also includes the plural unless it is obvious that it is meant otherwise.

The materials, methods, and examples herein are illustrative only and, except as specifically stated, are not intended to be limiting.

Steam Generation Methods

The steam generating processes of the present invention are particularly useful in an integrated catalytic gasification process for converting carbonaceous materials to combustible gases, such as methane, while achieving a low or near zero carbon footprint, due the capture of carbon dioxide produced in the process (e.g., in steps (b) and (e) of the first aspect, and steps (b) and (g) of the second aspect). Typically, as much of this carbon dioxide should be captured, and substantially all should be captured, where possible.

A typical flow chart for integration into a process for generating a combustible gas from a carbonaceous feedstock is illustrated in FIG. 1, and referenced herein. Generally, steam and a carbonaceous feedstock are provided to a gasifier (200), wherein under appropriate temperature and pressure conditions, and in the presence of one or more gasification catalysts, the carbonaceous feedstock is converted into a plurality of product gases, including, but not limited to, methane, carbon monoxide, hydrogen, and carbon dioxide.

The steam is generated from action of reactor (100) and is conveyed via a heated gas conduit (110) from the reactor to the catalytic gasifier (200). Reactor (100) includes, but is not limited to, commercial gasification reactors, oxy-fuel combustors, and boilers.

Reactor (100) is fed with a first carbonaceous feedstock (404), from a feedstock preparation operation (402), and generally may comprise one or a mixture of any carbonaceous material. For example, the first carbonaceous feedstock may comprise one or more biomasses; or one or more non-biomasses, such as coal and/or petroleum coke; or a mixture of biomasses and non-biomasses. In one example, fines (403, e.g., coal fines) generated in the crushing of carbonaceous materials for the preparation of a second carbonaceous feedstock (401) for the gasifier (200) can be used in preparing feedstock (404). Notably, a second source for fines can be from waste fines from bituminous coal cleaning and existing waste coal impoundments or ponds, thereby aiding in improving and preventing environmental pollution as a result of mining and processing operations. Alternatively, the first carbonaceous feedstock (404) may comprise any combustible gas, such as methane, carbon monoxide, hydrogen, natural gas, butane, and mixtures thereof.

The at least partial gasification or at least partial combustion of the first carbonaceous feedstock in reactor (100) generates large amounts of heat energy and an exhaust gas comprising at least carbon dioxide.

Advantageously, this heat energy can be used to contact any type of heat exchanger, in contact with a water source, to generate steam. For example, any of the boilers known to those skilled in the art can supply steam to gasifier (200). While any water source can be used to generate steam, the water commonly used in known boiler systems is purified and deionized (about 0.3-1.0 μS/cm) so that corrosive processes are slowed. Such boilers can be powered, for example, through the oxygen-blown combustion of any carbonaceous material, including pulverized/powdered coal, biomass, and rejected carbonaceous materials from the feedstock preparation operation (e.g., fines, supra). Ultimately, the thermal energy from the gasification or combustion of the first carbonaceous feedstock may heat the water in reactor (100), which eventually converts into steam (typically at about 1300° F. and 500 psi).

The steam produced by action of the reactor (100) can be generally variable based on the type of reactor and feedstock being utilized. Preferably, the steam can be provided to the catalytic gasifier in the range of about 550 psia to about 600 psia and about 1300° F. to about 1400° F. (about 700° C. to about 760° C.). More preferably, reactor (100) produces steam at a pressure essentially the same as the conditions being utilized in the catalytic gasifier (200), as any excess heat can be more efficiently captured for use in other operations (e.g., feedstock drying).

In another example, the contacting of water with the heat energy to produce steam may be occur within reactor (100) either by the addition of water to the reactor via a separate feed line (103), or by supplying a first carbonaceous feedstock (404), for example, as an aqueous slurry of the carbonaceous material, such as described in previously incorporated U.S. patent application Ser. No. 12/343,149. In this embodiment, the water (for preparing the aqueous slurry and/or fed into the reactor) can either be produced from a clean water feed (e.g., a municipal water supply) and/or recycle processes. For example, reclaimed water from sour water stripping operation and/or catalytic feedstock drying operations can be used. In one embodiment, the water is not clean but instead contains organic matter, such as untreated wastewater from farming, coal mining, and municipal waste treatment facilities or like sources. The organic matter in the wastewater becomes part of the carbonaceous feedstock.

Further, the exhaust gas generated from either gasification or combustion of the first carbonaceous feedstock in reactor (100) is supplied either (i) combined with the generated steam via heated conduit (110) or via a second heated conduit (120) to catalytic gasifier (200). In the cases where reactor (100) is an oxy-combustion reactor or a fired boiler, the exhaust gas generated may comprise carbon dioxide, and optionally steam. In the cases where reactor (100) is a second gasification reactor, then the exhaust gas may comprise carbon monoxide, hydrogen, and optionally, steam, carbon dioxide, and/or methane. For example, steam can be generated within a slurry gasifier which produces steam and synthesis gas from an aqueous carbonaceous feed slurry, such as described in previously incorporated U.S. patent application Ser. No. 12/343,149. By directing the exhaust gas from reactor (100), produced by the generation of steam, through the catalytic gasifier (200) and the associated gas purification and separation unit operations (supra), essentially all the carbon dioxide produced from the steam generation process as well as from the gasification of a second carbonaceous material may be recovered, yielding an overall catalytic gasification process having a reduced or near zero, or possibly negative, carbon footprint.

By "carbon footprint", reference is made to the carbon dioxide released into the environment from non-biomass sources, for example, from the combustion of fossil fuels and release of the resulting carbon dioxide into the atmosphere. Capture and sequestration of all carbon dioxide generated from non-biomass sources would be considered to have a neutral carbon footprint, as no carbon dioxide would have been released into the atmosphere.

By contrast, the release of carbon dioxide into the atmosphere from biomass sources is considered carbon footprint neutral, since biomass is created (for example, directly as a plant, or indirectly as part of the food chain) by the capture and conversion of carbon dioxide from the atmosphere. As such, the capture and sequestration of carbon dioxide generated from biomass sources can actually result in a negative (reduced) carbon footprint.

Steam can also be supplied from a second gasification reactor (100) coupled with a combustion turbine, the exhaust of which contacts a heat exchanger in contact with a water source (e.g., a boiler system), to produce steam. The steam and exhaust gas (from the combustion turbine) so produced may be provided to the gasifier, as discussed previously.

The steam generated by reactor (100) may be routed, in whole or in part, into one or more heated conduits (105), which may be located at or near an exit conduit carrying the combustion gases. For example, the steam may be divided into a plurality of steam streams (e.g., into a first and second steam stream), each comprising a portion of the steam. Each steam stream can be routed in a variety of directions; for example, one or more steam streams may be provided to the gasification reactor via a heated conduit (110); or one or more steam streams can be used to dry a carbonaceous feedstock (e.g., via heated conduit 130); or one or more steam streams can be routed to a steam turbine (2000, via heated conduit 140) for generation of electricity (2001). In order to avoid excessive cooling of the steam during transport, the heated conduits may be superheated according to methods known to those skilled in the art (e.g., via contact with a heat exchanger) prior to delivery of the steam to any endpoint. In one particular example, all the steam generated from reactor (100) is provided to gasifier (200).

Recycled steam from other process operations can also be used for supplementing steam to the catalytic gasifier. For example in the preparation of the second carbonaceous feedstock, when slurried particulate composition may be dried with a fluid bed slurry drier, as discussed below, then the steam generated can be fed to the catalytic gasification reactor (200).

The small amount of required heat input for the catalytic gasifier can be provided by, for example, superheating the steam provided to the gasifier; or superheating a mixture of the steam and any second gas source feeding the gasification reactor by any method known to one skilled in the art. In one method, compressed recycle gas of CO and $H_2$ (902, supra) can be mixed with the steam and the resulting steam/recycle gas mixture can be further superheated by heat exchange with the catalytic gasifier effluent followed by superheating in a recycle gas furnace.

Catalytic Gasification Methods

The gas utilized in the catalytic gasifier (200) for pressurization and reactions of the second carbonaceous feedstock comprises steam, and optionally, other gases such as oxygen or air, carbon monoxide and hydrogen.

The catalytic gasification reactor (catalytic gasifier; 200) is typically operated at moderately high pressures and temperature, requiring introduction of a second carbonaceous feedstock (405) and a gasification catalyst (e.g., an alkali metal gasification catalyst) to a reaction zone of the catalytic gasifier while maintaining the required temperature, pressure, and flow rate of the feedstock. Those skilled in the art are familiar with feed systems for providing feedstocks to high pressure and/or temperature environments, including, star feeders, screw feeders, rotary pistons, and lock-hoppers. It should be understood that the feed system can include two or more pressure-balanced elements, such as lock hoppers, which would be used alternately.

The second carbonaceous feedstock and gasification catalyst may be introduced separately or combined as a single catalyzed feedstock (supra) and is generally provided to the catalytic gasifier (200) from a feedstock preparation operation (400). In some instances, the second carbonaceous feedstock (405) can be prepared at pressures conditions above the operating pressure of catalytic gasifier. Hence, the second carbonaceous feedstock (405) may be directly passed into the catalytic gasifier without further pressurization.

Any of several catalytic gasifiers (200) can be utilized in the process of the described herein. Suitable gasifiers include counter-current fixed bed, co-current fixed bed, fluidized bed, entrained flow, and moving bed reactors. A catalytic gasifier for gasifying liquid feeds, such as liquid petroleum residues, is disclosed in previously incorporated U.S. Pat. No. 6,955,695.

The pressure in the catalytic gasifier (200) typically can be from about 10 to about 100 atm (from about 150 to about 1500 psig). The gasification reactor temperature can be maintained around at least about 450° C., or at least about 600° C., or at least about 900° C., or at least about 750° C., or about 600° C. to about 700° C.; and at pressures of at least about 50 psig, or at least about 200 psig, or at least about 400 psig, to about 1000 psig, or to about 700 psig, or to about 600 psig.

In one embodiment, a methane reformer (1000) can be optionally included in the process. For example, when reactor (100) is a gasification reactor, a methane reformer (1000) may be included in the process to supplement the recycle CO and $H_2$ stream and the exhaust gas (120, as shown in FIG. 1) and/or steam stream (110) from the reactor to ensure that enough recycle gas is supplied to the reactor so that the net heat of reaction is as close to neutral as possible (only slightly exothermic or endothermic), in other words, that the catalytic gasifier is run under substantially thermally neutral conditions. In such instances, methane (901a) can be supplied for the reformer from the methane product (901), as described below.

Reaction of the second carbonaceous feedstock (405) in the catalytic gasifier (200), in the presence of one or more gasification catalysts, and the first carbonaceous feedstock (404) in reactor (100), under the described conditions, provides a crude product gas. Since the exhaust gas (120) from reactor (100) is provided in whole to the gasifier (200), the crude product gas comprises essentially all the carbon dioxide produced from reactor (100) and gasifier (200). Additionally, both reactor (100) and gasifier (200) produce a char (102 and 202, respectively).

The char produced in the catalytic gasifier (202) processes is typically removed from the catalytic gasifier for sampling, purging, and/or catalyst recovery in a continuous or batchwise manner. Methods for removing char are well known to those skilled in the art. One such method taught by EP-A-0102828, for example, can be employed. The char can be periodically withdrawn from the catalytic gasification reactor through a lock hopper system, although other methods are known to those skilled in the art.

Often, the char (202) from the catalytic gasifier is directed to a catalyst recovery and recycle process (300). Processes have been developed to recover alkali metal from the solid purge in order to reduce raw material costs and to minimize environmental impact of a catalytic gasification process. For example, the char (202) can be quenched with recycle gas and water and directed to a catalyst recycling operation for extraction and reuse of the alkali metal catalyst. Particularly useful recovery and recycling processes are described in U.S. Pat. No. 4,459,138, as well as previously incorporated U.S. Pat. No. 4,057,512 and US2007/0277437A1, and previously incorporated U.S. patent application Ser. Nos. 12/342,554, 12/342,715, 12/342,736 and 12/343,143. Reference can be had to those documents for further process details.

Upon completion of catalyst recovery, both the char, substantially free of the gasification catalysts (302) as described herein, and the recovered catalyst (301) (as a solution or solid) can be directed to the feedstock preparation operation (400) comprising a second carbonaceous feedstock preparation process (401) and a steam feedstock preparation process (402), as described herein. The char (202) can, for example, be utilized as the first carbonaceous feedstock.

The char (102) produced in reactor (100) is typically removed via similar methods to those described for the catalytic gasification reactor. However, the char from reactor (100) is not normally processed through catalyst recovery, but rather, can be processed for disposal. Certain biomasses, however, contain alkali metal content, thus the char from such biomass may be recovered and extracted to provide a leachate for preparing the second carbonaceous feedstock (405), as described in previously incorporated U.S. patent application Ser. No. 12/395,433, entitled "CATALYTIC GASIFICATION PARTICULATE COMPOSITIONS" or may be recovered and utilized, itself, as part of the second carbonaceous feedstock (405), as described in previously incorporated U.S. patent application Ser. No. 12/395,429, entitled "BIOMASS CHAR COMPOSITIONS FOR CATALYTIC GASIFICATION".

Crude product gas effluent leaving the catalytic gasifier (200) can pass through a portion of the reactor which serves as a disengagement zone where particles too heavy to be entrained by the gas leaving the reactor (i.e., fines) are returned to the fluidized bed. The disengagement zone can include one or more internal cyclone separators or similar devices for removing fines and particulates from the gas. The gas effluent (201) passing through the disengagement zone and leaving the catalytic gasifier generally contains $CH_4$, $CO_2$, $H_2$ and CO, $H_2S$, $NH_3$, other higher hydrocarbons, unreacted steam, entrained fines, and other contaminants such as COS.

The gas stream from which the fines have been removed (201) can then be passed through a heat exchanger (500) to cool the gas and the recovered heat can be used to preheat recycle gas and generate high pressure steam (501). Residual entrained fines can also be removed by any suitable means such as external cyclone separators, optionally followed by Venturi scrubbers. The recovered fines can be processed to recover alkali metal catalyst then passed to the slurry feedstock preparation process (402) or returned to the catalytic gasification reactor, or directly recycled back to feedstock preparation as described in previously incorporated U.S. patent application Ser. No. 12/395,385, entitled "CARBONACEOUS FINES RECYCLE".

The gas stream (502) from which the fines have been removed can be fed to a gas purification operation (600) comprising COS hydrolysis reactors (601) for COS removal (sour process) and further cooled in a heat exchanger to recover residual heat prior to entering water scrubbers (602) for ammonia recovery, yielding a scrubbed gas comprising at least $H_2S$, $CO_2$, CO, $H_2$, and $CH_4$. Methods for COS hydrolysis are known to those skilled in the art, for example, see U.S. Pat. No. 4,100,256. The residual heat from the scrubbed gas can be used to generate low pressure steam.

Scrubber water (605) and sour process condensate (604) can be processed to strip and recover $H_2S$, $CO_2$ and $NH_3$; such processes are well known to those skilled in the art. $NH_3$ can typically be recovered as an aqueous solution (e.g., 20 wt %). Alternatively, scrubber water (605) and sour process condensate (604) can be returned to the slurry gasifier, thereby reducing overall process water usage and eliminating separate cleanup of these process streams.

A subsequent acid gas removal process (603) can be used to remove $H_2S$ and $CO_2$ from the scrubbed gas stream by a physical absorption method involving solvent treatment of the gas to give a cleaned gas stream. Such processes involve contacting the scrubbed gas with a solvent such as monoethanolamine, diethanolamine, methyldiethanolamine, diisopropylamine, diglycolamine, a solution of sodium salts of amino acids, methanol, hot potassium carbonate or the like. One method can involve the use of Selexol® (UOP LLC, Des Plaines, IL USA) or Rectisol® (Lurgi AG, Frankfurt am Main, Germany) solvent having two trains; each train consisting of an $H_2S$ absorber and a $CO_2$ absorber. The spent solvent (607) containing $H_2S$, $CO_2$ and other contaminants can be regenerated by any method known to those skilled in the art, including contacting the spent solvent with steam or other stripping gas to remove the contaminants or by passing the spent solvent through stripper columns. Recovered acid gases can be sent for sulfur recovery processing; for example, any recovered $H_2S$ from the acid gas removal and sour water stripping can be converted to elemental sulfur by any method known to those skilled in the art, including the Claus process. Sulfur can be recovered as a molten liquid. Stripped water can be directed for recycled use in preparation of the first and/or second carbonaceous feedstock. One method for removing acid gases from the scrubbed gas stream is described in previously incorporated U.S. patent application Ser. No. 12/395,344, entitled "SELECTIVE REMOVAL AND RECOVERY OF ACID GASES FROM GASIFICATION PRODUCTS".

Advantageously, $CO_2$ generated in the process, whether in the steam generation or catalytic gasification or both, can be recovered for subsequent use or sequestration, enabling a greatly decreased carbon footprint (as compared to direct combustion of the feedstock) as a result. For example, steam may be generated with reduced carbon footprint as described in previously incorporated U.S. patent application Ser. No. 12/395,309, entitled "STEAM GENERATION PROCESSES UTILIZING BIOMASS FEEDSTOCKS".

The resulting cleaned gas stream (606) exiting the gas purification operation (600) contains mostly $CH_4$, $H_2$, and CO and, typically, small amounts of $CO_2$ and $H_2O$. The cleaned gas stream (606) can be further processed to separate and recover $CH_4$ by any suitable gas separation method (900) known to those skilled in the art including, but not limited to, cryogenic distillation and the use of molecular sieves or ceramic membranes, or via the generation of methane hydrate as disclosed in previously incorporated U.S. patent application Ser. No. 12/395,330, entitled "PROCESS AND APPARATUS FOR THE SEPARATION OF METHANE FROM A GAS STREAM".

Typically, two gas streams can be produced by the gas separation process (900), a methane product stream (901) and a syngas stream (902, $H_2$ and CO). The syngas stream (902) can be compressed and recycled. One option can be to recycle the syngas steam directly to the catalytic gasifier (200). In one case, the recycled syngas is combined with the exhaust gas (101) from the slurry gasifier, and the mixture introduced into the catalytic gasification reactor. In another case, as exemplified in FIG. 2, the recycled syngas (902) can be directed into the slurry gasifier (100). When a fluid bed reactor is utilized for the slurry gasifier (100), the syngas may provide fluidization or aid in fluidization of the reaction bed.

If necessary, a portion of the methane product (901a) can be directed to a reformer, as discussed previously. The need to direct a portion of the methane product can be controlled, for example, by the ratio of CO to $H_2$ in the exhaust gas from the slurry gasifier (100). Particularly, methane can be directed to a reformer to supplement (1001) the exhaust gas (101) supplied to the catalytic gasification reactor and, in some instance, provide a ratio of about 3:1 of $H_2$ to CO in the feed to the catalytic gasification reactor. A portion of the methane product can also be used as plant fuel for a gas turbine.

Carbonaceous Feedstocks

The carbonaceous feedstocks supplied to the catalytic gasifier (200) and the steam generating reactor (100) may comprise any one or combination of carbonaceous materials. Such feedstocks supplied to the catalytic gasifier and steam generating reactor may be same or different. In one embodiment, the first, second or both carbonaceous feedstocks comprise biomass. In another embodiment, the first, second, or both carbonaceous feedstocks comprise non-biomass carbonaceous material. In yet another embodiment, the first, second, or both carbonaceous feedstocks comprise biomass and non-biomass carbonaceous material.

The second carbonaceous feedstock (405) for the catalytic gasifier typically comprises at least one carbonaceous material, as discussed previously, and a gasification catalyst.

The first and/or second carbonaceous feedstock may be supplied as a particulate. Generally, the particulates independently have an average particle size of from about 25 microns, or from about 45 microns, up to about 500, or up to about 2500 microns. One skilled in the art can readily determine the appropriate particle size for the individual particulates and the first and second carbonaceous feedstocks. For example, when a fluid bed gasification reactor is used as reactor (100) and/or gasifier (200), the first and/or second carbonaceous feedstock can have an average particle size which enables incipient fluidization of the carbonaceous feedstock at the gas velocity used in the fluid bed gasification reactor.

The term "carbonaceous material" as used herein refers to any carbonaceous material including, but not limited to coal, petroleum coke, asphaltenes, liquid petroleum residues, used motor oil and other waste processed petroleum sources, untreated or treated sewage waste, garbage, plastics, wood and other biomass, or mixtures thereof. The carbonaceous materials for the feedstock can comprise carbon sources containing at least about 20%, or at least about 30%, or at least about 40%, or at least about 50%, or at least about 60%, or at least about 70%, or at least about 80% carbon by dry weight.

The term "biomass", as used herein refers to carbonaceous materials derived from recently (for example, within the past 100 years) living organisms, including plant-based biomass and animal-based biomass. For clarification, biomass does not include fossil-based carbonaceous materials, such as coal.

The term "plant-based biomass" as used herein means materials derived from green plants, crops, algae, and trees, such as, but not limited to, sweet sorghum, bagasse, sugarcane, bamboo, hybrid poplar, hybrid willow, albizia trees, eucalyptus, alfalfa, clover, oil palm, switchgrass, sudangrass, millet, jatropha, and miscanthus (e.g., *Miscanthus* x *giganteus*). Biomass further include wastes from agricultural cultivation, processing, and/or degradation such as corn cobs and husks, corn stover, straw, nut shells, vegetable oils, canola oil, rapeseed oil, biodiesels, tree bark, wood chips, sawdust, and yard wastes.

The term "animal-based biomass" as used herein means wastes generated from animal cultivation and/or utilization. For example, biomass includes, but is not limited to, wastes from livestock cultivation and processing such as animal manure, guano, poultry litter, animal fats, and municipal solid wastes (e.g., sewage).

The term "non-biomass", as used herein, means those carbonaceous materials which are not encompassed by the term "biomass" as defined herein. For example, non-biomass include, but is not limited to, anthracite, bituminous coal, sub-bituminous coal, lignite, petroleum coke, asphaltenes, liquid petroleum residues, or mixtures thereof.

The term "petroleum coke" as used herein includes (i) the solid thermal decomposition product of high-boiling hydrocarbon fractions obtained in petroleum processing (heavy residues); and (ii) the solid thermal decomposition product of processing tar sands (bituminous sands or oil sands) Such carbonization products include, for example, green, calcined, needle and fluidized bed petroleum coke. Petroleum coke is generally prepared via delayed coking or fluid coking. The petroleum coke can be residual material remaining after retorting tar sands (e.g., mined) are heated to extract any oil.

Resid petcoke can also be derived from a crude oil, for example, by coking processes used for upgrading heavy-gravity residual crude oil, which petroleum coke contains ash as a minor component, typically about 1.0 wt % or less, and more typically about 0.5 wt % of less, based on the weight of the coke. Typically, the ash in such lower-ash cokes predominantly comprises metals such as nickel and vanadium.

Tar sands petcoke can be derived from an oil sand, for example, by coking processes used for upgrading oil sand. Tar sands petcoke contains ash as a minor component, typically in the range of about 2 wt % to about 12 wt %, and more typically in the range of about 4 wt % to about 12 wt %, based on the overall weight of the tar sands petcoke. Typically, the ash in such higher-ash cokes predominantly comprises materials such as compounds of silicon and/or aluminum.

The petroleum coke can comprise at least about 70 wt % carbon, at least about 80 wt % carbon, or at least about 90 wt % carbon, based on the total weight of the petroleum coke. Typically, the petroleum coke comprises less than about 20 wt % percent inorganic compounds, based on the weight of the petroleum coke.

The term "liquid petroleum residue" as used herein includes both (i) the liquid thermal decomposition product of high-boiling hydrocarbon fractions obtained in petroleum processing (heavy residues—"resid liquid petroleum residue") and (ii) the liquid thermal decomposition product of processing tar sands (bituminous sands or oil sands—"tar sands liquid petroleum residue"). The liquid petroleum residue is substantially non-solid; for example, it can take the form of a thick fluid or a sludge.

Resid liquid petroleum residue can also be derived from a crude oil, for example, by processes used for upgrading heavy-gravity crude oil distillation residue. Such liquid petroleum residue contains ash as a minor component, typically about 1.0 wt % or less, and more typically about 0.5 wt % of less, based on the weight of the residue. Typically, the ash in such lower-ash residues predominantly comprises metals such as nickel and vanadium.

Tar sands liquid petroleum residue can be derived from an oil sand, for example, by processes used for upgrading oil sand. Tar sands liquid petroleum residue contains ash as a minor component, typically in the range of about 2 wt % to about 12 wt %, and more typically in the range of about 4 wt % to about 12 wt %, based on the overall weight of the residue. Typically, the ash in such higher-ash residues predominantly comprises materials such as compounds of silicon and/or aluminum.

The term "coal" as used herein means peat, lignite, sub-bituminous coal, bituminous coal, anthracite, graphite, or mixtures thereof. In certain embodiments, the coal has a carbon content of less than about 85%, or less than about 80%, or less than about 75%, or less than about 70%, or less than about 65%, or less than about 60%, or less than about 55%, or less than about 50% by weight, based on the total coal weight. In other embodiments, the coal has a carbon content ranging up to about 85%, or up to about 80%, or up to about 75% by weight, based on total coal weight. Examples of useful coals include, but are not limited to, Illinois #6, Pittsburgh #8, Beulah (N. Dak.), Utah Blind Canyon, and Powder River Basin (PRB) coals. Anthracite, bituminous coal, sub-bituminous coal, and lignite coal may contain about 10 wt %, from about 5 to about 7 wt %, from about 4 to about 8 wt %, and from about 9 to about 11 wt %, ash by total weight of the coal on a dry basis, respectively. However, the ash content of any particular coal source will depend on the rank and source of the coal, as is familiar to those skilled in the art (see, for example, *Coal Data: A Reference*, Energy Information Administration, Office of Coal, Nuclear, Electric and Alternate Fuels, U.S. Department of Energy, DOE/EIA-0064(93), February 1995)).

Asphaltenes typically comprise aromatic carbonaceous solids at room temperature, and can be derived, from example, from the processing of crude oil, oil shale, bitumen, and tar sands.

Catalyst Components

As noted above, the second carbonaceous feedstock and gasification catalyst may be introduced to gasifier (200) separately or combined as a single catalyzed feedstock. Suitable gasification catalysts include, but are not limited to, alkali metals such as lithium, sodium, potassium, rubidium, cesium, and mixtures thereof Particularly useful are potassium sources. Suitable alkali metal compounds include alkali metal carbonates, bicarbonates, formates, oxalates, amides, hydroxides, acetates, or similar compounds. For example, the catalyst can comprise one or more of $Na_2CO_3$, $K_2CO_3$, $Rb_2CO_3$, $Li_2CO_3$, $Cs_2CO_3$, NaOH, KOH, RbOH or CsOH, and particularly, potassium carbonate and/or potassium hydroxide.

The second carbonaceous feedstock, in certain embodiments, further comprises an amount of an alkali metal component, as an alkali metal and/or an alkali metal compound, as well as optional co-catalysts, as disclosed in the previous incorporated references. Typically, the quantity of the alkali metal component in the composition is sufficient to provide a ratio of alkali metal atoms to carbon atoms ranging from about 0.01, or from about 0.02, or from about 0.03, or from about 0.04, to about 0.06, or to about 0.07, or to about 0.08. Further, the alkali metal is typically loaded onto a carbon source to achieve an alkali metal content of from about 3 to about 10 times more than the combined ash content of the carbonaceous material (e.g., coal and/or petroleum coke), on a mass basis.

Methods for Making a Catalyzed Feedstock

The second carbonaceous feedstock (405) may comprise a particulate composition of one or more carbonaceous materials and a gasification catalyst (i.e., a catalyzed feedstock). Each carbonaceous material may require initial processing to prepare or catalytic gasification. For example, when using a second carbonaceous feedstock comprising a mixture of two or more carbonaceous materials, such as petroleum coke and coal, the petroleum coke and coal can be separately processed to add catalyst to one or both portions, and subsequently mixed. Alternately, the carbonaceous materials can be combined immediately prior to the addition of a catalyst.

The carbonaceous materials can be crushed and/or ground according to any methods known in the art, such as impact crushing and wet or dry grinding to yield particulates of each. Depending on the method utilized for crushing and/or grinding of the carbonaceous material, the resulting particulates can be sized (i.e., separated according to size) to provide an appropriate feedstock.

Any method known to those skilled in the art can be used to size the particulates. For example, sizing can be preformed by screening or passing the particulates through a screen or number of screens. Screening equipment can include grizzlies, bar screens, and wire mesh screens. Screens can be static or incorporate mechanisms to shake or vibrate the screen. Alternatively, classification can be used to separate the petroleum coke and coal particulates. Classification equipment can include ore sorters, gas cyclones, hydrocyclones, rake classifiers, rotating trommels, or fluidized classifiers. The carbonaceous material can be also sized or classified prior to grinding and/or crushing. Any fines (403) separated from the preparation process can be directed to preparation (402) of the feedstock for the reactor (100).

Additional feedstock processing steps may be necessary depending on the qualities of carbonaceous materials. For example, carbonaceous materials containing high moisture levels, such as raw and/or treated sewage and high-moisture coals, can require drying prior to crushing. Some caking coals can require partial oxidation to simplify gasification reactor operation. Various coals deficient in ion-exchange sites can be pre-treated to create additional ion-exchange sites to facilitate catalysts loading and/or association. Such pre-treatments can be accomplished by any method known to the art that creates ion-exchange capable sites and/or enhances the porosity of a coal feed (see, for example, previously incorporated U.S. Pat. No. 4,468,231 and GB1599932). Often, pre-treatment is accomplished in an oxidative manner using any oxidant known to the art.

In one example, coal is typically wet ground and sized (e.g., to a particle size distribution of about 25 to 2500 microns) and then drained of its free water (i.e., dewatered) to a wet cake consistency. Examples of suitable methods for the wet grinding, sizing, and dewatering are known to those skilled in the art; for example, see previously incorporated U.S. patent application Ser. No. 12/178,380.

Any methods known to those skilled in the art can be used to associate one or more gasification catalysts with the carbonaceous material. Such methods include but are not limited to, admixing with a solid catalyst source, impregnating the catalyst on to the carbonaceous material particulate, incipient wetness impregnation, evaporative impregnation, vacuum impregnation, dip impregnation, and combinations of these methods. Gasification catalysts can be impregnated into the carbonaceous materials (i.e., particulate) by slurrying with a solution (e.g., aqueous) of the catalyst.

The carbonaceous material particulate can be treated to associate at least a first catalyst (e.g., gasification catalyst) therewith, providing the second carbonaceous feedstock. In some cases, a second catalyst (e.g., co-catalyst) can be provided; in such instances, the particulate can be treated in separate processing steps to provide the first catalyst and second catalysts. For example, the primary gasification catalyst can be supplied (e.g., a potassium and/or sodium source), followed by a separate treatment to provide a co-catalyst source. Alternatively, the first and second catalysts can be provided as a mixture in a single treatment.

One particular method suitable for combining coals with the gasification catalysts and optional co-catalysts to provide a particulate composition where the various components have been associated with the coal particulate via ion exchange is described in previously incorporated U.S. patent application Ser. No. 12/178,380. The ion exchange loading mechanism is maximized (based on adsorption isotherms specifically developed for the coal), and the additional catalyst retained on wet including those inside the pores is controlled so that the total catalyst target value is obtained in a controlled manner. Such loading provides a particulate composition as a wet cake. The catalyst loaded and dewatered wet coal cake typically contains, for example, about 50% moisture. The total amount of catalyst loaded is controlled by controlling the concentration of catalyst components in the solution, as well as the contact time, temperature and method, as can be readily determined by those of ordinary skill in the relevant art based on the characteristics of the starting coal.

Additional particulates derived from carbonaceous materials can be combined with the second carbonaceous feedstock prior to introduction into the catalytic gasification reactor by any methods known to those skilled in the art. For example, a second carbonaceous feedstock comprising a coal particulate and a gasification catalyst can be combined with biomass. Such methods include, but are not limited to, kneading, and vertical or horizontal mixers, for example, single or twin screw, ribbon, or drum mixers. The second carbonaceous feedstock (405) can be stored for future use or transferred to a feed operation for introduction into a gasification reactor. The second carbonaceous feedstock (405) can be conveyed to storage or feed operations according to any methods known to those skilled in the art, for example, a screw conveyer or pneumatic transport.

EXAMPLES

Example 1

Catalyzed and Slurry Feedstock Preparation

As-received coal (Powder River Basin) can be stage-crushed to maximize the amount of material having particle sizes ranging from about 0.85 to about 1.4 mm. Fines (<0.85 mm) are separated from the crushed materials by vibratory screening and directed to the steam generating combustion reactor.

The crushed coal would be slurried with an aqueous solution of potassium carbonate, dewatered, and dried via a fluid bed slurry drier to typically yield a catalyzed feedstock containing 185 lb coal (88 wt %), 14.9 lb catalyst (7 wt %), and 10.5 lb moisture (5 wt %). The coal fines separated at the crushing stage can be used as the feedstock for combustion reactor for the preparation of steam.

Example 2

Catalytic Gasification

The fines of Example 1 can be provided to a combustion reactor fed by an enriched oxygen source. The resulting exhaust gas from the combustion reactor would contain hot $CO_2$. The exhaust gas can be passed through a heat exchange in contact with a water source to produce steam. The generated steam and the exhaust gas from the combustion reactor can be superheated and then introduced to a fluidized bed gasification reactor (catalytic gasifier) supplied with the catalyzed feedstock of Example 1. The catalyzed feedstock is introduced under a positive pressure of nitrogen. Typical conditions for the catalytic gasifier would be: total pressure, 500 psi and temperature, 1200° F. The effluent of the catalytic gasifier would contain methane, $CO_2$, $H_2$, CO, water, $H_2S$, ammonia, and nitrogen, which is passed to a scrubber to remove ammonia and an acid gas removal unit to remove $H_2S$ and $CO_2$. The $CO_2$ can then be recovered.

We claim:

1. A process for generating steam and a plurality of gaseous products from a carbonaceous feedstock and recovering carbon dioxide, the process comprising the steps of:
    (a) supplying a first carbonaceous feedstock to a reactor, the reactor in communication with a gasifier;
    (b) at least partially combusting first carbonaceous feedstock in the reactor to generate (i) heat energy and (ii) a first gas stream comprising carbon dioxide;
    (c) utilizing the heat energy to generate steam;
    (d) introducing at least a portion of the steam, the first gas stream, a second carbonaceous feedstock, and an alkali metal gasification catalyst to a gasifier;
    (e) reacting the second carbonaceous feedstock in the gasifier in the presence of the steam and the alkali metal gasification catalyst and under suitable temperature and pressure to form a second gas stream comprising a plurality of gaseous products comprising methane, carbon dioxide and one or more gases selected from the group consisting of hydrogen, carbon monoxide, hydrogen sulfide, ammonia and other higher hydrocarbons;
    (f) at least partially separating the plurality of gaseous products to produce (i) a third gas stream comprising carbon dioxide and (ii) a fourth gas stream comprising a predominant amount of one of the gaseous products other than carbon dioxide;
    (g) recovering the third gas stream; and
    (h) recovering the fourth gas stream,
wherein the third gas stream includes carbon dioxide formed in steps (b) and (e).

2. The process of claim 1, wherein the third gas stream includes substantially all of the carbon dioxide formed in steps (b) and (e).

3. The process of claim 1, wherein the first carbonaceous feedstock is in a form of an aqueous slurry.

4. The process of claim 1, wherein the first, second or both carbonaceous feedstocks comprise biomass.

5. The process of claim 1, wherein the first gas stream further comprises carbon monoxide and hydrogen.

6. The process of claim 1, wherein the reactor is a gasifier or an oxygen combuster.

7. The process of claim 1, wherein the gasification catalyst comprises a source of at least one alkali metal and is present in an amount sufficient to provide, in the biomass feedstock, a ratio of alkali metal atoms to carbon atoms ranging from 0.01 to about 0.08.

8. The process of claim 1, wherein the steam is generated within the reactor.

9. The process of claim 1, wherein the heat energy is transferred to a heat exchanger which generates steam upon contact with water.

10. The process of claim 1, wherein the fourth gas stream comprises a predominant amount of methane.

11. A process for generating steam, electricity and a plurality of gaseous products from carbonaceous feedstock and recovering carbon dioxide, the process comprising the steps of:
    (a) supplying a first carbonaceous feedstock to a reactor, the reactor in communication with a gasifier;
    (b) at least partially combusting first carbonaceous feedstock in the reactor to generate (i) heat energy and (ii) a first gas stream comprising carbon dioxide;
    (c) contacting water with the heat energy to generate steam;
    (d) dividing the steam into a first steam stream and a second steam stream;
    (e) introducing the first steam stream, the first gas stream, a second carbonaceous feedstock, and an alkali metal gasification catalyst to a gasifier;
    (f) introducing the second steam stream to a steam turbine to generate electricity;
    (g) reacting the second carbonaceous feedstock in the gasifier in the presence of the steam and the alkali metal gasification catalyst and under suitable temperature and pressure to form a second gas stream comprising a plurality of gaseous products comprising methane, carbon dioxide and one or more gases selected from the group consisting of hydrogen, carbon monoxide, hydrogen sulfide, ammonia and other higher hydrocarbons;
    (h) at least partially separating the plurality of gaseous products to produce (i) a third gas stream comprising carbon dioxide and (ii) a fourth gas stream comprising a predominant amount of one of the gaseous products other than carbon dioxide;
    (i) recovering the third gas stream; and
    (j) recovering the fourth gas stream,
wherein the third gas stream includes carbon dioxide formed in steps (b) and (g).

12. The process of claim 11, wherein the third gas stream includes substantially all of the carbon dioxide formed in steps (b) and (g).

13. The process of claim 11, wherein the first carbonaceous feedstock is in a form of an aqueous slurry.

14. The process of any claim 11, wherein the first, second or both carbonaceous feedstocks comprise biomass.

15. The process of claim 11, wherein the first gas stream further comprises carbon monoxide and hydrogen.

16. The process of claim 11, wherein the reactor is a gasifier or an oxygen combuster.

17. The process of claim 11, wherein the gasification catalyst comprises a source of at least one alkali metal and is present in an amount sufficient to provide, in the biomass feedstock, a ratio of alkali metal atoms to carbon atoms ranging from 0.01 to about 0.08.

18. The process of claim 11, wherein the steam is generated within the reactor.

19. The process of claim 11, wherein the heat energy is transferred to a heat exchanger which generates steam upon contact with water.

20. The process of claim 11, wherein the fourth gas stream comprises a predominant amount of methane.

* * * * *